US009488496B2

(12) United States Patent
Stanley

(10) Patent No.: US 9,488,496 B2
(45) Date of Patent: Nov. 8, 2016

(54) POSITION MEASUREMENT USING FLUX MODULATION AND ANGLE SENSING

(75) Inventor: James Gregory Stanley, Novi, MI (US)

(73) Assignee: BOURNS, INC., Riverside, CA (US)

( * ) Notice: Subject to any disclaimer, the term of this patent is extended or adjusted under 35 U.S.C. 154(b) by 645 days.

(21) Appl. No.: 13/614,454

(22) Filed: Sep. 13, 2012

(65) Prior Publication Data

US 2014/0070798 A1 Mar. 13, 2014

(51) Int. Cl.
*G01B 7/14* (2006.01)
*G01B 7/30* (2006.01)
*G01D 5/14* (2006.01)

(52) U.S. Cl.
CPC .............. *G01D 5/145* (2013.01); *G01D 5/147* (2013.01)

(58) Field of Classification Search
CPC ................................ G01B 7/003; G01B 7/14
USPC ............................ 324/207.13, 207.15, 207.25
See application file for complete search history.

(56) References Cited

U.S. PATENT DOCUMENTS

| 4,864,237 | A | 9/1989 | Hoenig |
| 5,418,453 | A * | 5/1995 | Wise ............................. 324/160 |
| 6,501,268 | B1 | 12/2002 | Edelstein et al. |
| 6,646,435 | B1 * | 11/2003 | Nakamura et al. ...... 324/207.25 |
| 7,046,002 | B1 | 5/2006 | Edelstein |
| 7,195,945 | B1 | 3/2007 | Edelstein et al. |
| 7,427,860 | B2 * | 9/2008 | Saito et al. .............. 324/207.25 |
| 7,915,890 | B2 | 3/2011 | Bonin |
| 7,923,999 | B2 | 4/2011 | Edelstein |
| 8,421,447 | B2 * | 4/2013 | Inoue ....................... 324/207.16 |
| 2003/0184282 | A1 * | 10/2003 | Wild ............................ 324/166 |
| 2003/0201879 | A1 * | 10/2003 | Munch et al. ............... 340/442 |
| 2006/0082365 | A1 * | 4/2006 | Hudson et al. .......... 324/207.25 |
| 2010/0134101 | A1 | 6/2010 | Riva et al. |
| 2011/0133727 | A1 | 6/2011 | Youngquist et al. |
| 2012/0293115 | A1 * | 11/2012 | Ramsesh ..................... 320/108 |

FOREIGN PATENT DOCUMENTS

| CN | 102170241 A | 8/2011 |
| DE | 102 20 911 | 12/2003 |
| EP | 1 498 697 | 1/2005 |

(Continued)

OTHER PUBLICATIONS

Extended European Search Report and Opinion received in European Patent Application No. 13183997.9, dated Dec. 10, 2013.
1st Office Action from The State Intellectual Property Office of the People's Republic of China for Application No. 201310414888.9 dated May 6, 2015 (11 pages).

(Continued)

*Primary Examiner* — Bot Ledynh
(74) *Attorney, Agent, or Firm* — Michael Best & Friedrich LLP

(57) ABSTRACT

Systems and methods for determining a position of a movable component. One system includes a controllable source of varying magnetic flux. In a particular embodiment, the magnetic flux is directed through a magnetic sensor using a first flux concentrator and a second flux concentrator. The sensor generates a sensor signal that is provided to an electrical circuit designed to demodulate the signal. The demodulated signal is provided to a controller. The controller converts the signal and calculates the position of the second flux concentrator relative to the first flux concentrator. The controller may take a predetermined action based on the calculated position of the second flux concentrator.

30 Claims, 6 Drawing Sheets

(56) References Cited

FOREIGN PATENT DOCUMENTS

| | | |
|---|---|---|
| WO | 97/18441 | 5/1997 |
| WO | 02/059555 | 8/2002 |
| WO | 02059555 A1 | 8/2002 |

OTHER PUBLICATIONS

English translation of 2nd Office Action from the State Intellectual Property Office of the People's Republic of China for Application No. 201310414888.9 dated Oct. 26, 2015 (9 pages).

* cited by examiner

POSITION MEASUREMENT USING FLUX MODULATION AND ANGLE SENSING

FIELD

Embodiments of the invention relate to determining a position of a movable component using a magnetic sensor.

BACKGROUND

Magnetic sensing has numerous advantages compared to other types of sensing. For example, magnetic sensors are generally immune to unclean environments (i.e., environments with dirt, most liquids or environments in which there are various sources of electromagnetic interference) and are relatively simple (especially when commercially-available sensing integrated circuits are used, such as Hall-based sensors and magneto-resistive sensors). Despite having certain advantages, in some applications, noise (often from external magnetic fields not originating within the position measurement system), contributes to the magnetic field sensed at a sensor. When this occurs, sensor measurements are inaccurate. Preventing or reducing the influence of noise typically involves using strong magnets in the sensor, providing magnetic shielding, and positioning magnetic concentrators near the sensor.

Another source of inaccuracy in magnetic sensors is caused by variation of absolute field strength at the sensor. One reason for this variation is a flux change in the magnetic circuit, which can be caused by changes in temperature. Another reason for the variation is variations in the relevant magnetic circuit that are not associated with the position measurement (i.e., gaps between magnetic circuit elements being altered).

SUMMARY

In some embodiments, the invention provides systems and methods for determining a position of a movable component using a magnetic sensor designed to reduce or overcome many of the noted problems. Embodiments of the invention use a combination of flux modulation and synchronous demodulation to reduce or eliminate the effect of external magnetic field noise sources on the sensor. Additionally, embodiments of the invention use a multi-dimensional (i.e., X and Y components) flux measurement to identify a position. Embodiments of the invention also achieve relatively high signal-to-noise ratios, which increases the accuracy of measurements of low-strength magnetic fields.

Instead of using magnetic field strength as a primary metric, embodiments of the invention use one or more magnetic field angles to determine position. Using a magnetic field angle to determine position results in more accurate measurements because the measurements are largely immune to variations in absolute field strength at the sensor. In particular, the angle of the magnetic field is not dependent on the absolute field strength at the sensor In one particular embodiment, the invention takes the form of a system for determining a position of a movable component. The system includes a controllable source of varying magnetic flux. The varying magnetic flux has a frequency. The system also includes a magnetic circuit and a magnetic sensor configured to output a sensor signal. The magnetic sensor is placed in the magnetic circuit such that the varying magnetic flux passes through the magnetic sensor. The angle of the flux through the magnetic sensor changes when the position of the movable component changes. A processor is configured to process the sensor signal such that the frequency components of the sensor signal are selectively filtered. The processor may include a synchronous demodulation circuit or a digital filter. The magnetic sensor is configured to measure the angle of the flux through the magnetic sensor, and the flux angle is an indicator of a position of the movable component.

The system of may also include a first magnetic flux concentrator that directs the magnetic flux, and a second magnetic flux concentrator movable relative to the first magnetic flux concentrator. Some of the varying magnetic flux is coupled between the first magnetic flux concentrator and the second magnetic flux concentrator.

Another particular embodiment of the invention provides a method for determining a position of a movable component. The method includes the steps of controlling a source of varying magnetic flux and measuring at least one directional component of the magnetic flux using at least one magnetic sensor positioned in the magnetic circuit such that the varying magnet flux passes through the magnetic sensor. The angle of the flux through the magnetic sensor changes when the position of the movable component changes. The method also includes processing a sensor signal from the magnetic sensor such that the frequency components of the sensor signal are selectively filtered.

The method may also include directing the magnetic flux through a first flux concentrator, magnetically coupling the first magnetic flux concentrator to a second magnetic flux concentrator, positioning the magnetic sensor between the first magnetic flux concentrator and the second magnetic flux concentrator, and measuring at least one directional component of the magnetic flux using the magnetic sensor Yet another embodiment of the invention provides a system for determining a position of a movable component. The system includes a magnetic circuit and a circuit. The magnetic circuit includes a controllable source of modulated magnetic flux, a first magnetic flux concentrator, a second magnetic flux concentrator, and at least one magnetic sensor. The first magnetic flux concentrator receives the magnetic flux. The second magnetic flux concentrator is movable relative to the first magnetic flux concentrator and receives the magnetic flux from the first magnetic flux concentrator. The magnetic sensor is positioned between the first magnetic flux concentrator and the second magnetic flux concentrator and is configured to measure at least one directional component of the magnetic flux. The circuit includes a mixer, a filter, and a controller. The mixer mixes the at least one directional component of the magnetic flux with a mixing signal and outputs a mixed signal. The filter filters the mixed signal and generates a demodulated signal. The controller determines a position of the second magnetic flux concentrator based on the demodulated signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
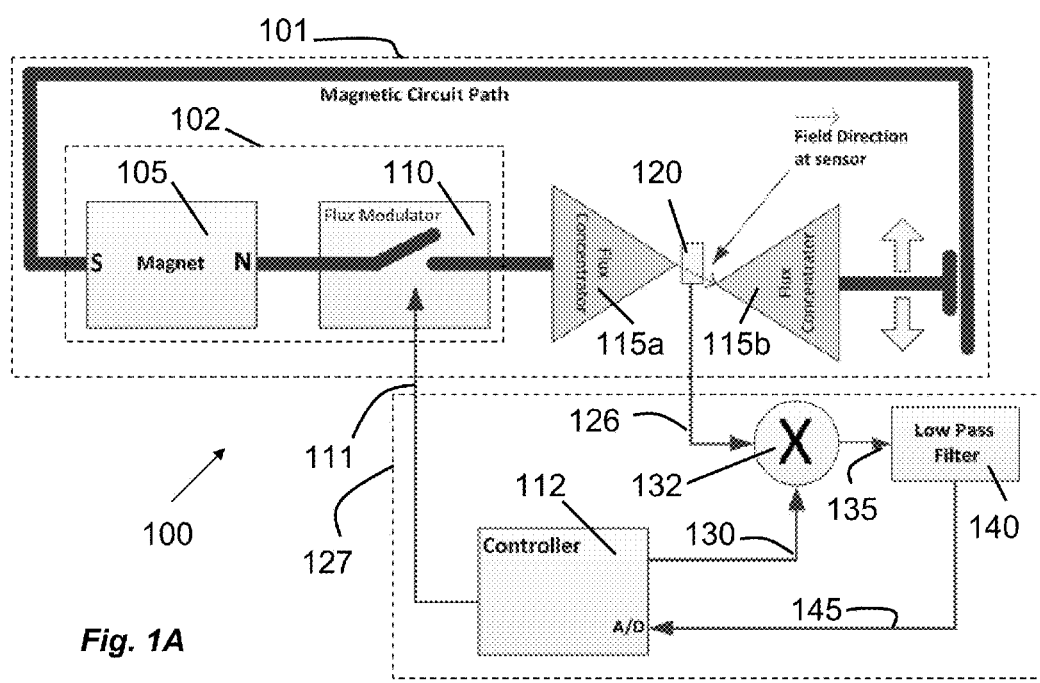
FIG. 1A schematically illustrates a system for determining a position of a movable component, with the movable component in a first position.

FIG. 1A illustrates a system 100 for determining the position of a movable component. The system 100 includes a magnetic circuit 101 having a controllable source 102 of varying magnetic flux. In some embodiments, the source 102 includes a magnet 105 and a flux modulator 110. The magnet 105 and the flux modulator 110 provide controlled varying magnetic flux to the magnetic circuit 101. The flux modulator 110 allows a reluctance of the magnetic circuit 101 to be varied. The flux modulator 110 is controlled by a controller 112 and is illustrated as a switch in order to convey that the modulator may be viewed as operating in a manner that is similar to how a switch operates. For example, at least in some embodiments, the flux modulator 110 may be opened and closed in a manner that is similar to how a switch is opened and closed. The magnetic circuit 101 also includes a first flux concentrator 115a, a second flux concentrator 115b, and a magnetic sensor 120. The first flux concentrator 115a and the second flux concentrator 115b are coupled via at least some of the magnetic flux generated by the magnet 105 and flux modulator 110. The magnetic sensor 120 could be a Hall-based sensor, a magneto-resistive sensor or another type of sensor that can be used to measure multiple components of the flux density or the magnetic field angle.

Figure 1B:
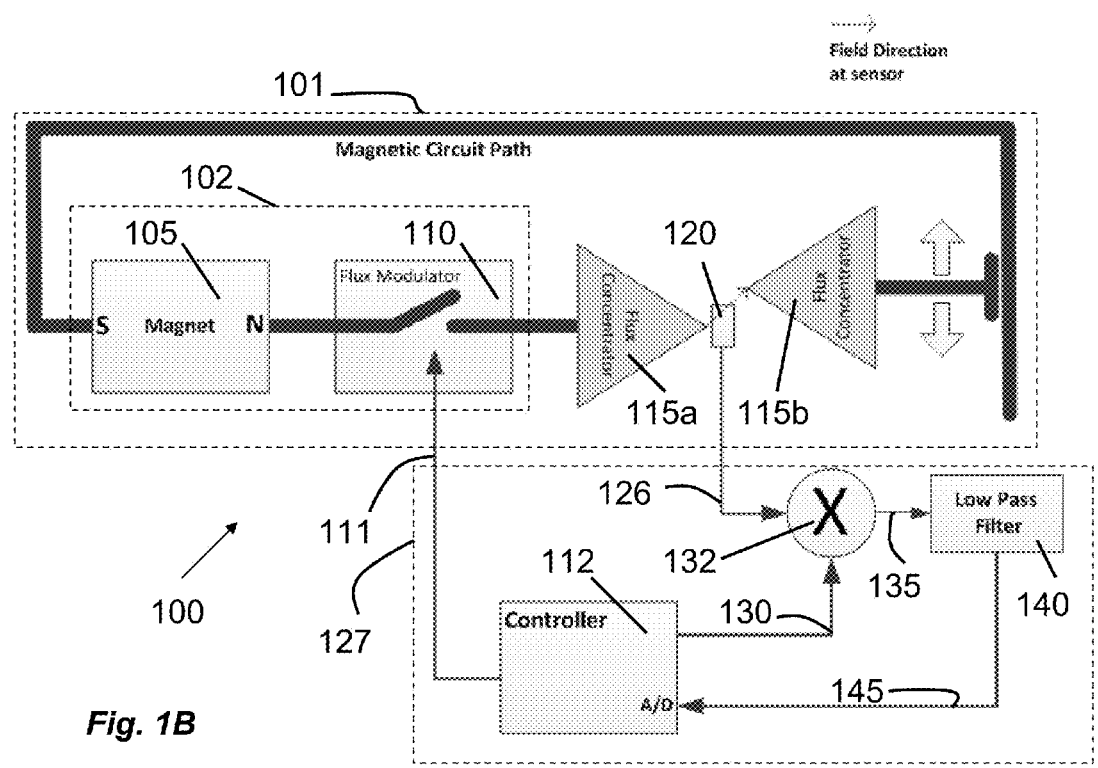
FIG. 1B schematically illustrates the system of FIG. 1A with the movable component in a second position.
Figure 2A:
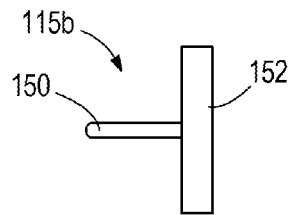
FIG. 2A is a cross-sectional view of the movable component of FIG. 1A in a third position.
Figure 3A:
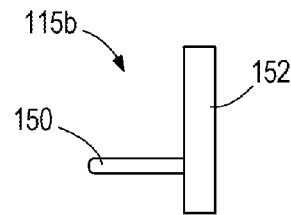
FIG. 3A is a cross-sectional view of the movable component of FIG. 1A in a fourth position.
Figure 2B:
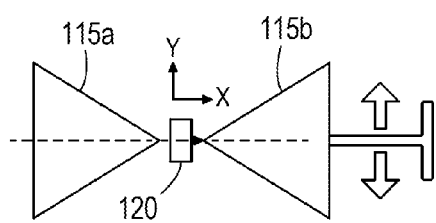
FIG. 2B schematically illustrates the system of FIG. 1A, viewed from an X-Y plane perspective, with the movable component in the third position of FIG. 2A.
Figure 3B:
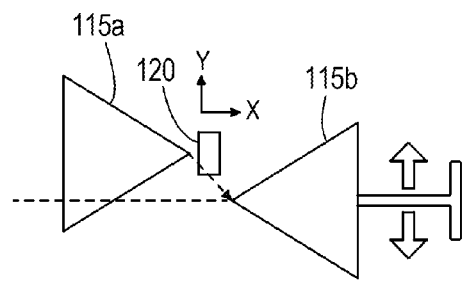
FIG. 3B schematically illustrates the system of FIG. 1A, viewed from an X-Y plane perspective, with the movable component in the fourth position of FIG. 3A.
Figure 2C:
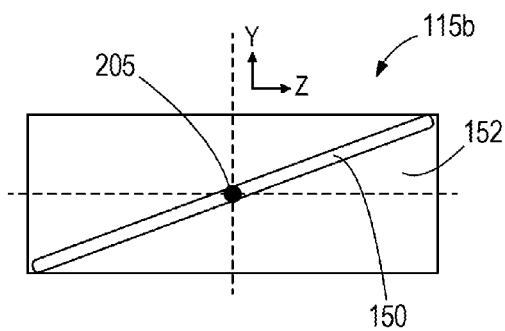
FIG. 2C schematically illustrates the system of FIG. 1A, viewed from a Y-Z plane perspective, with the movable component in the third position of FIG. 2A.
Figure 3C:
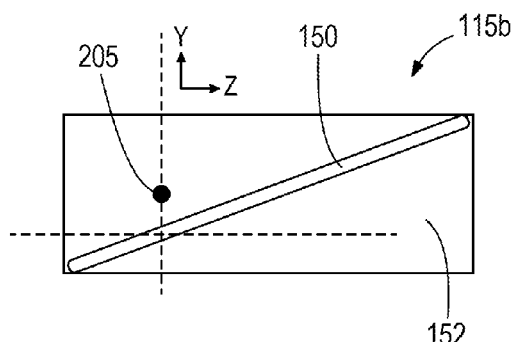
FIG. 3C schematically illustrates the system of FIG. 1A, viewed from a Y-Z plane perspective, with the second magnetic flux concentrator in the fourth position of FIG. 3A.
Figure 4A:
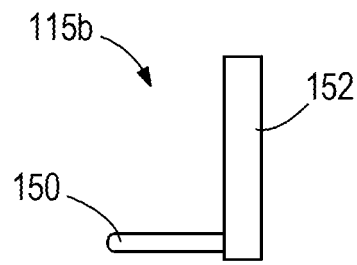
FIG. 4A is a side view of the movable component of FIG. 1A in a fifth position.
Figure 4B:
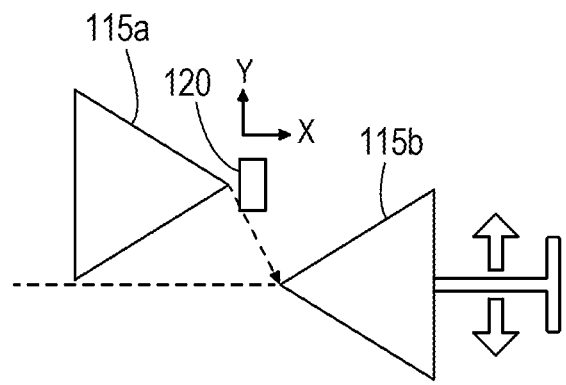
FIG. 4B schematically illustrates the system of FIG. 1A, viewed from an X-Y plane perspective, with the movable component in the fifth position of FIG. 4A.
Figure 4C:
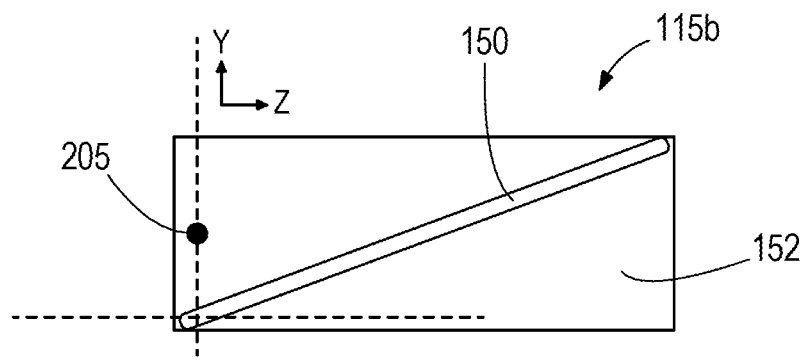
FIG. 4C schematically illustrates the system of FIG. 1A, viewed from a Y-Z plane perspective, with the movable component in the fifth position of FIG. 4A.

The controller 112 generates a modulation signal 111 signal (such as a periodic digital signal or other signal) to cause the flux modulator 110 to change its state. The change of state may occur periodically or repeatedly so that the magnetic flux through the flux concentrators 115a and 115b and through the sensor 120 is varied at a known frequency. The controlled magnetic flux provided by the magnet 105 and flux modulator 110 is directed through the sensor 120 by the first flux concentrator 115a and the second flux concentrator 115b. The second flux concentrator 115b is movable relative to the first flux concentrator 115a as indicated in FIGS. 1A and 1B. The movement of the second flux concentrator 115b alters the direction of the magnetic flux through the sensor 120.

The sensor 120 measures at least one directional component (e.g., an X-component, a Y-component, or both) of the magnetic flux and outputs or transmits the measured component values via an output signal 126 to an electrical circuit 127 as indicated in FIGS. 1A and 1B. The output signal 126 is mixed with a mixing signal 130 from the controller 112 in a mixer 132. The mixing signal 130 has substantially the same frequency as the magnetic flux directed through the sensor 120. Preferably, the phases of the output signal 126 and the mixing signal 130 are aligned. Countermeasures for phase shifts between the modulated sensor output 126 and the mixer signal 130 are known by those familiar with synchronous demodulators and are discussed briefly later in this detailed description. The mixer 132 outputs or transmits a signal 135 to a low-pass filter 140. Low-pass filtering the signal results in a demodulated signal 145 representing one or more magnetic flux components. The demodulated signal 145 is not significantly influenced by external magnetic fields (i.e., noise), with the exception of external magnetic fields modulated at the same frequency. In other words, the modulation and demodulation process carried out in the system 100 reduces noise in the output signal 126 of the sensor 120.

The demodulated signal 145 is transmitted to the controller 112. The controller 112 performs an analog-to-digital conversion on the signal 145 and uses the digital signal to determine an angle of the magnetic flux through the sensor 120. The determination of the angle of the magnetic flux may be achieved using known techniques.

After determining the angle of the magnetic flux, the controller 112 (or a separate controller external to the system 100) calculates a position of the second flux concentrator 115b based on the angle of the magnetic flux through the sensor 120. In some embodiments, the angle of the magnetic flux through the sensor 120 does not vary with the absolute level of magnetic field strength. Therefore, variations in magnetic field strength do not cause inaccuracies in the position measurement of the position of the second flux concentrator 115b.

After calculating the position of the second flux concentrator 115b, the controller 112 (or one or more separate controllers external to the system 100) may provide the position information to a second system. For example, if the second flux concentrator is mounted on a component of a vehicle transmission, the position of the second flux concentrator 115b may indicate a state of the transmission (e.g., in drive, reverse, or neutral). The position information (e.g., a position associated with the transmission being in reverse) can be supplied to a control system to turn on a reverse or back-up light on the vehicle. This is just one example of action that can be taken. After calculating the position of the second flux concentrator 115b, the controller 112 or controllers or other systems that receive the position information may take one or more predetermined actions (e.g., maintain current settings, adjust current settings, transmit data to another controller, etc.)

While this detailed description and the block diagrams imply an analog synchronous demodulation system, the system could also use digital techniques to filter, adjust gain and offset, and mix the relevant signals to achieve similar results. Such techniques are known in the art and could be used with this measurement concept without changing the scope of this invention.

In one embodiment, the second flux concentrator 115b travels in a Z-direction rather than a Y-direction as shown in FIG. 1A. FIGS. 2A-4C illustrate the second flux concentrator 115b traveling in the Z-direction. The second flux concentrator 115b includes two plates 150 and 152. The plates 150 and 152 are located in separate planes and the planes are perpendicular to one another. The linear range measurable by the sensor 120 is increased by moving the second flux concentrator 115b in the Z-direction instead of the Y-direction. As illustrated in FIGS. 2A-4C, while the second flux concentrator 115b travels in the Z-direction, the closest point of the second flux concentrator 115b to the tip 205 of the first flux concentrator 115a varies in the Y-direction because of the shape and orientation of the second flux concentrator 115b. The tip 205 of the first concentrator 115a remains stationary while the second concentrator 115b is movable in the Z-direction.

The second concentrator 115b is shaped such that movement of the second concentrator 115b in the Z-direction alters the flux angle between the closest point on the second concentrator 115b to the tip 205 of the first concentrator 115a in the X-Y plane. The relatively slow movement of the tip of the concentrator 115B (that is, the part of the concentrator tip 115B that is closest to the concentrator tip 115A) in the X-Y plane compared to the concentrator's movement in the Z-direction allows for a large translation in the Z-direction with a relatively small change in flux angle between the tips. Thus, a relatively large translation in Z by the concentrator 115B can be measured as a small change in flux angle by the magnetic sensor. It should be understood that other shapes and orientations of the first flux concentrator 115a and the second flux concentrator 115b are possible.

Figure 5:
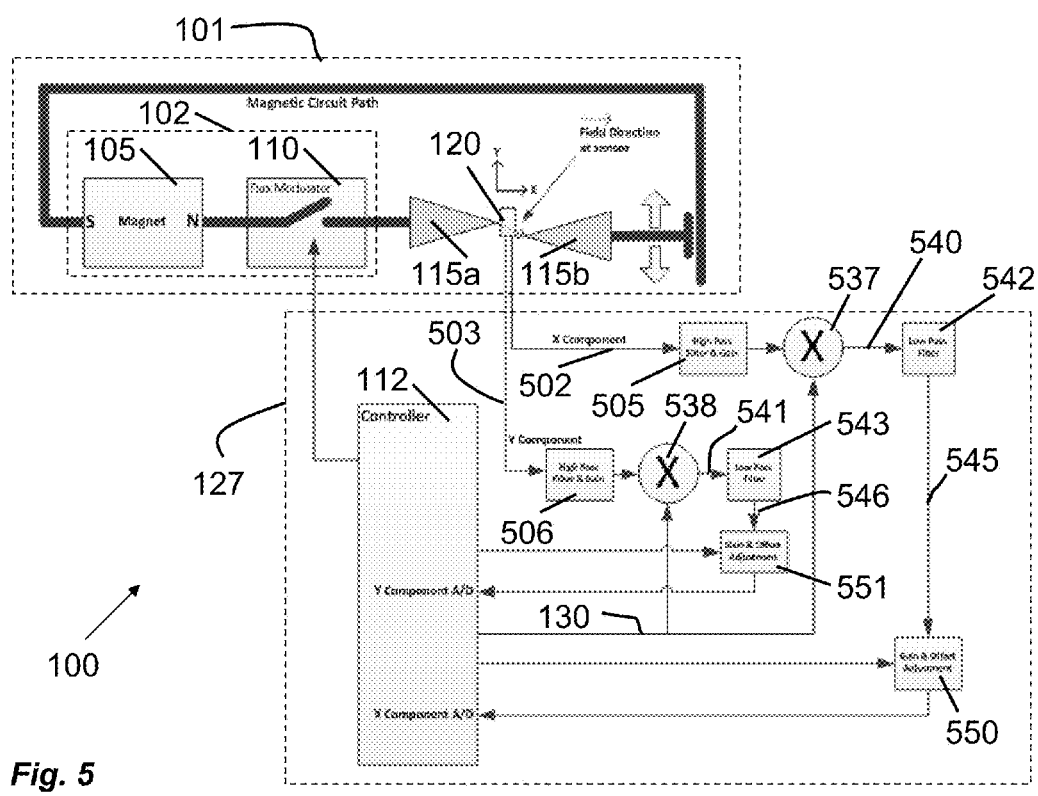
FIG. 5 illustrates an alternative embodiment of the system of FIG. 1A including additional circuit components.

FIG. 5 illustrates an alternative embodiment of the system 100 in which the sensor 120 is configured to output multiple signal components, namely X and Y components. The FIG. 5 embodiment of the system 100 also includes additional circuitry to process the additional signal component (as compared to the embodiment shown in FIG. 1). In the FIG. 5 embodiment, the measured component values (e.g., an X-component value and a Y-component value) are measured separately by one or separate sensor components and transmitted to an electrical circuit 127 as separate component signals 502 and 503. However, each component signal 502 and 503 is processed through similar circuitry. The component signals 502 and 503 from the sensor 120 are first transmitted through a high-pass filter and signal gain circuitry 505 and 506. The component signals are then mixed with the mixing signal 130 in mixers 537 and 538. The mixers 537 and 538 output signals 540 and 541 to low-pass filters 542 and 543. The resulting synchronously-demodulated signals 545 and 546 from the low-pass filters 542 and 543 may have low signal levels. In circumstances where this occurs, the signals 545 and 546 are conditioned in gain and offset adjustment circuits 550 and 551 to achieve desired compensation for the low signal levels. Circuits 550 and 551 amplify or adjust the gain of the signals. The offset of each signal is also adjusted in the circuits 550 and 551. After any desired conditioning is performed, the resulting signals from circuits 550 and 551 are provided or transmitted to the controller 112.

To accurately measure the magnetic flux through the sensor 120, a zero-level offset is determined prior to using the system 100 for position measurements. The zero-level offset is determined by closing the flux modulator 110 and measuring the magnetic flux through the sensor 120. An offset adjustment is modified based on the zero-level offset to optimize the dynamic range of the system. The gains and offsets of the circuits 550 and 551 are adjusted iteratively such that all signal levels are within range of the analog-to-digital converter of the controller 112. Making these adjustments helps to ensure a maximum (or more generally, broad) resolution for the system 100. After passing through the gain and offset adjustment circuits 550 and 551, the resulting signals are transmitted to the controller 112.

As described above, the controller 112 performs an analog-to-digital conversion on the resulting signals from circuits 550 and 551. The controller 112 uses both component signals 502 and 503 to calculate the angle of the magnetic flux through the sensor 120 and, subsequently, the position of the second flux concentrator 115b. As noted above, the controller 112 can also be configured to provide the position information to another controller or system or take a predetermined action based on the calculated position of the second flux concentrator 115b.

To make accurate angle calculations, the amplitudes of the separate component signals 502 and 503 should be true amplitudes relative to each other. In other words, the units of measurement should be the same or comparable. To achieve this, the gain and offset circuitry for each signal 502 and 503 should be substantially identical or configured to perform substantially identical conditioning.

To accurately determine the amplitude of the component signals 502 and 503, errors caused by phase shifting should be addressed. To make an accurate determination, phase shifting between the output of the sensor 120 (signals 502 and 503) and the mixing signal 130 should be dealt with. In one embodiment, a phase shift between the output signal (signals 502 and 503) and the mixing signal 130 is prevented by gradually shifting the phase of the mixing signal 130 until the demodulated signal (signals 545 and 546) from the low-pass filter (542 and 543) reaches a maximum absolute amplitude away from a zero-signal offset.

In an alternative embodiment (not pictured), a phase shift between the output signal of the sensor 120 and the mixing signal 130 is prevented (or at least reduced) by mixing the output signal and the modulating signal 130 using two mixers: a first mixer and a second mixer. The first mixer receives the output signal of the sensor 120 and a signal in phase with the modulating signal 111. The second mixer receives the output signal and a quadrature signal (e.g., a signal approximately 90 degrees out-of-phase with the modulating signal). Both signals are low pass filtered and go through gain and offset adjustment as described earlier. The magnitude of the output signal of the sensor 120 is then calculated using the resulting components from the in-phase and quadrature demodulation circuits. In the case where X and Y components of the flux are calculated before the flux angle is calculated, there is an in-phase and quadrature measurement for both X and Y.

In the embodiments described so far, signal processing is performed in circuits located outside of the sensor 120. In alternative embodiments, signal processing circuitry is located within the sensor 120 (designated sensor 120A) as is illustrated, for example, in FIG. 6. For purposes of the application, "within the sensor" encompasses configurations where the circuitry is within the same housing or located locally with the sensor.

Figure 6:
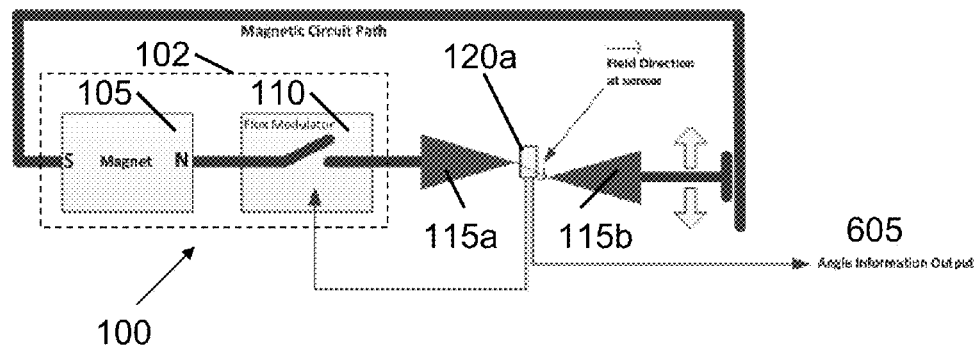
FIG. 6 illustrates an alternative embodiment of the system of FIG. 1A with additional circuit components located inside the sensor.

In the embodiment shown in FIG. 6, the electronics to drive the flux modulator 110 are located within the sensor 120a or integrated into the flux modulator 110. In this embodiment, the angle information output 605 can be an analog signal or a digital signal (e.g., a pulse width modulation signal or other digital communication signals known to those skilled in the art).

Flux modulators useful in embodiments of the invention may take one of a variety of forms. In one embodiment, the flux modulator 110 is a mechanical system that oscillates such that the reluctance through the flux modulator 110 varies at an oscillation frequency. In an alternate embodiment, the flux modulator 110 is created by altering (or controlling) the permeability of a series element within the magnetic circuit 101. In this embodiment, the series element is periodically driven into magnetic saturation by creating a magnetic field at the series element. An electric current located near the series element is used to create the magnetic field used to drive the series element into magnetic saturation. In further alternate embodiments, the flux modulator 110 is created using a material with magnetic properties that can be modified by an external source (e.g., magnetostrictive materials or piezomagnetic materials).

Figure 7:
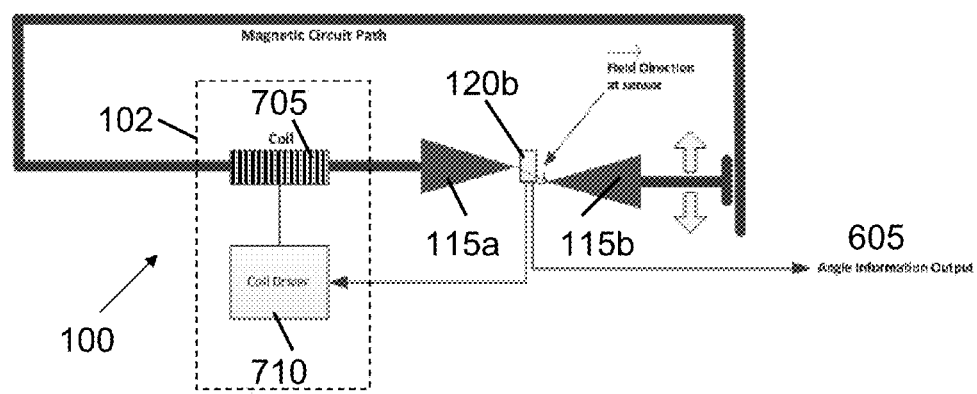
FIG. 7 illustrates an alternative embodiment of the system of FIG. 1A using a coil as a flux generator.

In yet another alternative, a coil 705 is used as the source 102 of controlled magnetic flux (FIG. 7) within the magnetic circuit 101. The coil 705 can be a wire-wound coil, a coil formed from traces on a printed circuit board, or another type of coil. The controller (located within the sensor 120b in FIG. 7) communicates with a coil driver 710 to control the current to the coil 705. The current to the coil 705 is periodically increased and decreased to create a time-varying magnetic flux with a known oscillation frequency. The flux is provided to the first flux concentrator 115a. In this embodiment, while the drive circuitry is located outside of the sensor, the sensing, modulation and demodulation circuitry, and calculation circuitry (e.g., controller 112) are located within the sensor 120 (designated 120B) as described above.

In one embodiment (not pictured), the flux modulator 110 is placed in parallel with the magnetic circuit 101 path through the first flux concentrator 115a, rather than in series with the magnetic circuit 101 path as shown in FIG. 1. Therefore, the reluctance of the parallel path is modulated. A reduced reluctance of the parallel path decreases the amount of magnetic flux through the sensor 120. Analogously, an enhanced reluctance of the parallel path increases the amount of magnetic flux through the sensor 120. In this embodiment, the sensing, electrical circuitry, and calculation of the angle of the magnetic flux are performed at the sensor 120 as described above.

In magnetic sensing applications, noise, such as external magnetic fields not created by the sensing system 100, can cause inaccuracies in sensed values. The present invention measures the angle of the magnetic flux through the sensor 120. Therefore, external magnetic fields passing through the sensor 120 in the same direction as the magnetic flux generated by the system 100 do not affect the reliability of the system 100 because the angle of the magnetic flux of the system 100 is not altered by external magnetic fields in the same direction as the magnetic flux generated by the system 100.

In addition, due to the flux modulation and signal demodulation occurring within the system 100, external magnetic fields passing through the sensor 120 (angle other than when passing through the sensor at the angle between the flux concentrators 115a and 115b) do not significantly affect the measurement of the angle of the magnetic flux through the sensor 120 unless the external magnetic field is varying at or near the known frequency of modulation (i.e. "in-band" noise). If such an external magnetic field is present, the system could detect it. For example, the modulation of the system's internally generated flux could be disabled (the flux modulator 110 is kept in one state) and the external magnetic field is measured by the sensor 120, using the normal demodulation circuitry 127 (in FIG. 5). If the external magnetic field is found to be consistent, the error in measurement caused by the external magnetic field becomes a part of the zero-signal offset for each component of the system's measurement. If the external magnetic field is found to be inconsistent or varying, the controller 112 can attempt to digitally filter the undesirable noise or enter a diagnostic mode (i.e. communicate somehow that there is a problem with the measurement).

Thus, embodiments of the invention provide, among other things, systems and methods for determining a position of a movable component using a magnetically-based sensor. The systems and methods make accurate position measurements when magnetic field strength within the system varies as well as in the presence of external magnetic fields not generated by the system.

Various features of the invention are set forth in the following claims.

What is claimed is:

1. A system for determining a position of a movable component, the system comprising:
   a controller that generates a control signal;
   a controlled source of varying magnetic flux electrically connected to the controller and configured to be controlled by the control signal from the controller to vary the varying magnetic flux at a known frequency;
   a magnetic circuit;
   a movable component; and
   a magnetic sensor configured to output a sensor signal and placed in the magnetic circuit such that the varying magnetic flux passes through the magnetic sensor, wherein an angle of the varying magnetic flux through the magnetic sensor changes when the position of the movable component changes;
   wherein the controller is further configured to process the sensor signal such that frequency components of the sensor signal are selectively filtered.

2. The system of claim 1, further comprising a synchronous demodulation circuit.

3. The system of claim 1, further comprising a digital filter.

4. The system of claim 1, wherein the magnetic sensor is configured to measure the angle of the varying magnetic flux through the magnetic sensor, and the angle of the varying magnetic flux is an indicator of the position of the movable component.

5. The system of claim 1, the system further comprising:
   a first magnetic flux concentrator directing the varying magnetic flux;
   a second magnetic flux concentrator movable relative to the first magnetic flux concentrator wherein some of the varying magnetic flux is coupled between the first magnetic flux concentrator and the second magnetic flux concentrator.

6. The system of claim 1, wherein the controlled source of varying magnetic flux includes a magnet and a flux modulator.

7. The system of claim 1, wherein the controlled source of varying magnetic flux includes a coil and a coil driver.

8. The system of claim 1, wherein the magnetic sensor is configured to measure an X-component and a Y-component of the varying magnetic flux.

9. The system of claim 1, further comprising a circuit configured to mix at least one directional component of the varying magnetic flux measured by the magnetic sensor with a mixing signal to generate a mixed signal, the mixing signal having a frequency substantially the same as the known frequency.

10. The system of claim 9, wherein the circuit is configured to transmit the mixed signal to at least one low-pass filter.

11. The system of claim 9, wherein the circuit is located within the magnetic sensor.

12. The system of claim 10, wherein the at least one low-pass filter outputs a demodulated signal.

13. The system of claim 12, wherein the controller is configured to receive the demodulated signal from the circuit.

14. The system of claim 13, wherein the controller is further configured to use the demodulated signal in a calculation.

15. The system of claim 13, wherein the controller is further configured to determine the angle of the varying magnetic flux through the magnetic sensor based on the demodulated signal.

16. The system of claim 5, wherein the controller is further configured to determine a position of the second magnetic flux concentrator based on the angle of the varying magnetic flux through the magnetic sensor.

17. The system of claim 5, wherein the controller is further configured to take a predetermined action based on the position of the second magnetic flux concentrator.

18. The system of claim 13, wherein the controller is located within the magnetic sensor.

19. The system recited in claim 5, wherein the second flux concentrator is shaped and positioned such that the second flux concentrator is movable in a first direction such that relative movement of the second flux concentrator, in a second direction perpendicular to the first direction, from the first flux concentrator can be determined and relative movement of the second flux concentrator, in a third direction perpendicular to both the first direction and the second direction, from the first flux concentrator can be determined.

20. A method for determining a position of a movable component, the method comprising:
controlling, via a control signal from a controller, a source of varying magnetic flux in a magnetic circuit such that the varying magnetic flux is varied at a known frequency;
measuring at least one directional component of the varying magnetic flux using a magnetic sensor positioned in the magnetic circuit such that the varying magnetic flux passes through the magnetic sensor, wherein an angle of the varying magnetic flux through the magnetic sensor changes when the position of the movable component changes; and
processing, with the controller, a sensor signal from the magnetic sensor such that frequency components of the sensor signal are selectively filtered.

21. The method of claim 19, further comprising
directing the varying magnetic flux through a first flux concentrator; and
coupling the varying magnetic flux from the first magnetic flux concentrator to a second magnetic flux concentrator, wherein the second magnetic flux concentrator is movable relative to the first magnetic flux concentrator.

22. The method of claim 19, wherein controlling the source of varying magnetic flux includes oscillating a mechanical system such that a reluctance of the magnetic circuit varies at the known frequency.

23. The method of claim 19, wherein controlling the source of varying magnetic flux includes controlling a coil driver that further controls a current to a coil.

24. The method of claim 19, wherein controlling the source of varying magnetic flux includes controlling a permeability of a component of the magnetic circuit.

25. The method of claim 24, wherein the permeability is controlled by controlling a current through a coil.

26. The method of claim 19, wherein measuring at least one directional component of the varying magnetic flux further comprises measuring an X-component and a Y-component of the varying magnetic flux.

27. The method of claim 19, further comprising mixing the at least one directional component of the varying magnetic flux with a mixing signal to generate a mixed signal, the mixing signal having a frequency substantially the same as the known frequency.

28. The method of claim 27, further comprising low-pass filtering the mixed signal to generate a demodulated signal.

29. The method of claim 28, wherein mixing the at least one directional component of the varying magnetic flux with the mixing signal and low-pass filtering the mixed signal occur within the magnetic sensor.

30. The method of claim 28, further comprising determining the angle of the varying magnetic flux through the magnetic sensor based on the demodulated signal.

* * * * *